US012728592B2

(12) United States Patent
Tambuyser

(10) Patent No.: US 12,728,592 B2
(45) Date of Patent: Sep. 8, 2026

(54) LARGE-SCALE ADDITIVE MANUFACTURING MATERIALS COMPRISING PYROLYZED LIGNOCELLULOSIC FILLER

(71) Applicant: CARBOGANIC, Meise (BE)

(72) Inventor: Bart Pieter Tambuyser, Meise (BE)

(73) Assignee: CARBOGANIC, Meise (BE)

( * ) Notice: Subject to any disclaimer, the term of this patent is extended or adjusted under 35 U.S.C. 154(b) by 174 days.

(21) Appl. No.: 18/269,090

(22) PCT Filed: Dec. 23, 2021

(86) PCT No.: PCT/EP2021/087585
§ 371 (c)(1),
(2) Date: Jun. 22, 2023

(87) PCT Pub. No.: WO2022/136679
PCT Pub. Date: Jun. 30, 2022

(65) Prior Publication Data

US 2024/0075684 A1 Mar. 7, 2024

(30) Foreign Application Priority Data

Dec. 23, 2020 (EP) .................................... 20217142

(51) Int. Cl.

| | |
|---|---|
| ***B29C 64/165*** | (2017.01) |
| ***B29K 401/00*** | (2006.01) |
| ***B33Y 70/00*** | (2020.01) |
| ***B33Y 80/00*** | (2015.01) |
| ***C08K 9/00*** | (2006.01) |

(52) U.S. Cl.
CPC ............ *B29C 64/165* (2017.08); *B33Y 70/00* (2014.12); *B33Y 80/00* (2014.12); *C08K 9/00* (2013.01); *B29K 2401/00* (2013.01); *C08K 2201/005* (2013.01)

(58) Field of Classification Search
CPC ....... B29C 64/165; B33Y 70/00; B33Y 80/00; C08K 9/00; B29K 2401/00
See application file for complete search history.

(56) References Cited

U.S. PATENT DOCUMENTS

| | | | | |
|---|---|---|---|---|
| 10,494,501 | B2 * | 12/2019 | Kander | B33Y 10/00 |
| 12,059,837 | B1 * | 8/2024 | Kleidon | B29C 64/245 |
| 2001/0052657 | A1 * | 12/2001 | Jacobsen | B27N 5/00 162/150 |
| 2013/0209779 | A1 | 8/2013 | Iida et al. | |

(Continued)

FOREIGN PATENT DOCUMENTS

| | | | |
|---|---|---|---|
| CN | 110003558 | A | 7/2019 |
| JP | 2001146796 | A1 | 5/2001 |

(Continued)

OTHER PUBLICATIONS

International Search Report from corresponding PCT Application No. PCT/EP2021/087585, May 11, 2022.

(Continued)

*Primary Examiner* — Nahida Sultana
(74) *Attorney, Agent, or Firm* — Workman Nydegger

(57) ABSTRACT

A material including (i) a polymer matrix and (ii) a pyrolyzed lignocellulosic filler dispersed in the polymer matrix, for large-scale additive manufacturing.

11 Claims, 4 Drawing Sheets

(56) References Cited

U.S. PATENT DOCUMENTS

| | | | | |
|---|---|---|---|---|
| 2016/0108243 | A1 * | 4/2016 | Deaner | B29C 48/80 264/211 |
| 2017/0240934 | A1 * | 8/2017 | Bai | C10B 57/08 |
| 2018/0118901 | A1 | 5/2018 | Harper et al. | |
| 2019/0030443 | A1 * | 1/2019 | Van Dan Elzen | A63H 1/24 |
| 2019/0330443 | A1 | 10/2019 | Kander | |
| 2020/0223986 | A1 | 7/2020 | Van Gilst | |
| 2022/0241829 | A1 * | 8/2022 | Ostvik | B29B 17/0026 |
| 2025/0101258 | A1 * | 3/2025 | Laborie | C09D 101/284 |

FOREIGN PATENT DOCUMENTS

| | | | | |
|---|---|---|---|---|
| JP | 2003311716 A | | 11/2003 | |
| JP | 2005081817 A | | 3/2005 | |
| JP | 2008230155 A | | 10/2008 | |
| JP | 2013035251 A | | 2/2013 | |
| JP | 2018083876 A | | 5/2018 | |
| JP | 2020515506 A | | 5/2020 | |
| JP | 2023035364 A | | 3/2023 | |
| WO | WO-2010130988 A1 | * | 11/2010 | C10B 49/22 |

OTHER PUBLICATIONS

Extended European Search Report from corresponding EP Application No. 20217142.7, Jun. 17, 2021.

Japanese Office Action from corresponding JP Application No. 2023-539755, Jun. 3, 2025.

Japanese Office Action from Corresponding Japanese Patent Application No. JP2023539755, Apr. 21, 2026.

* cited by examiner

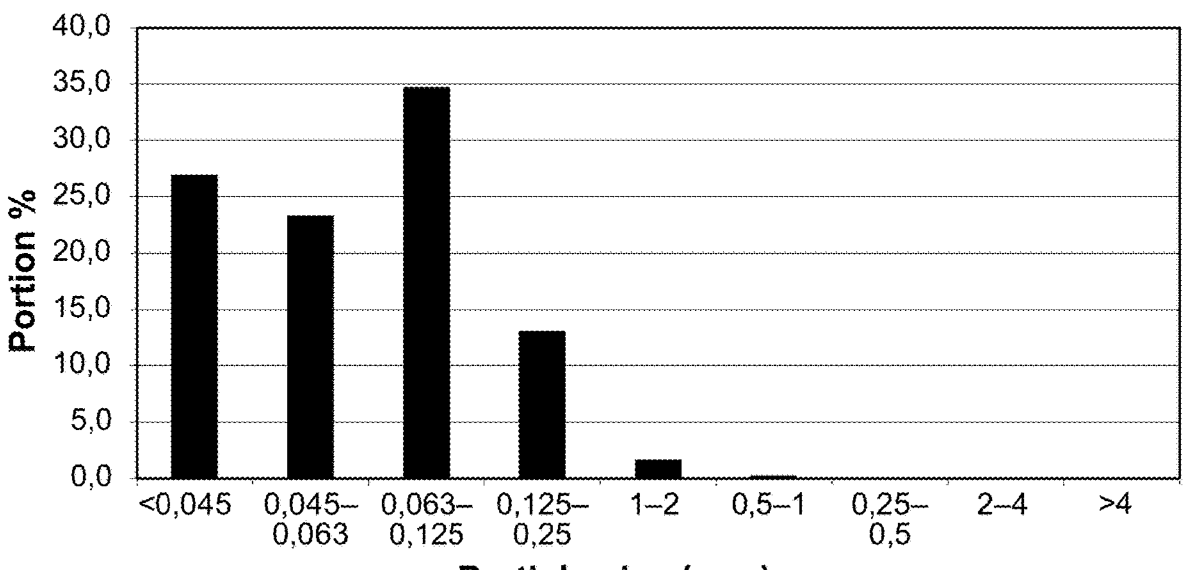
FIG 7
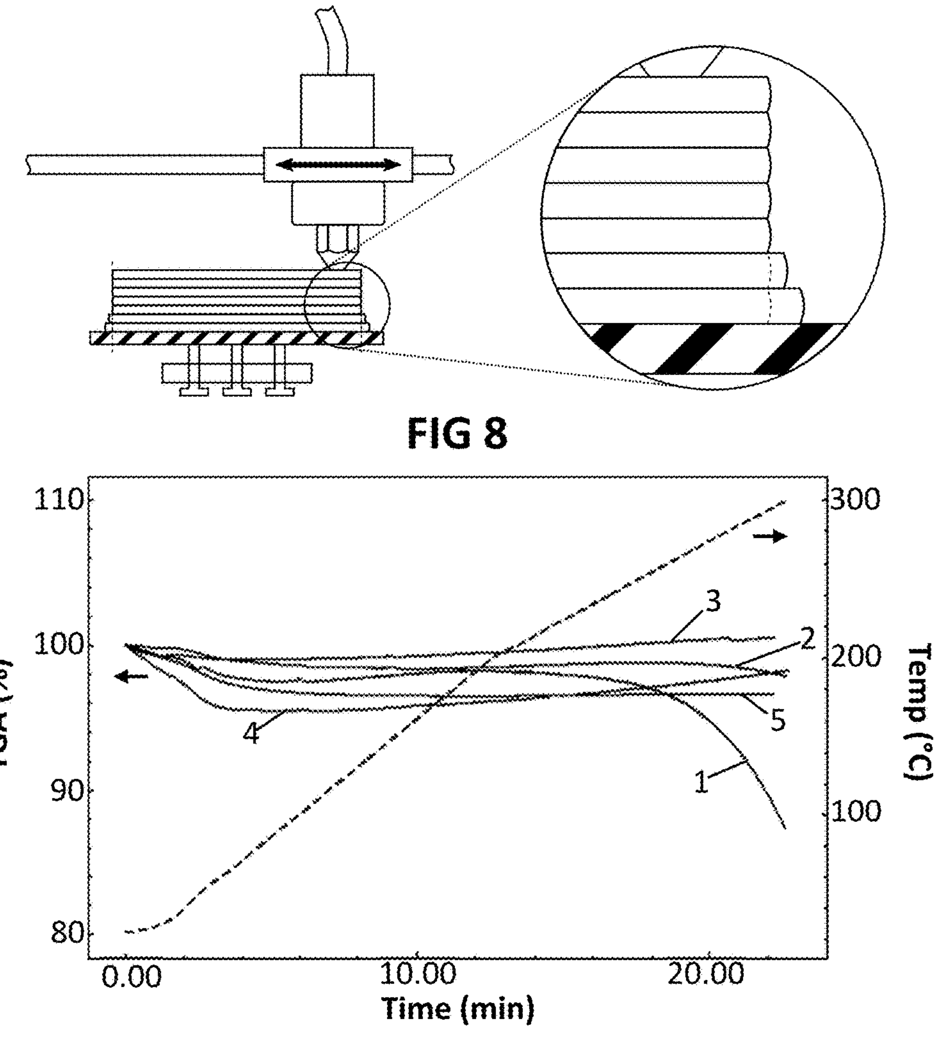
FIG 8
FIG 9

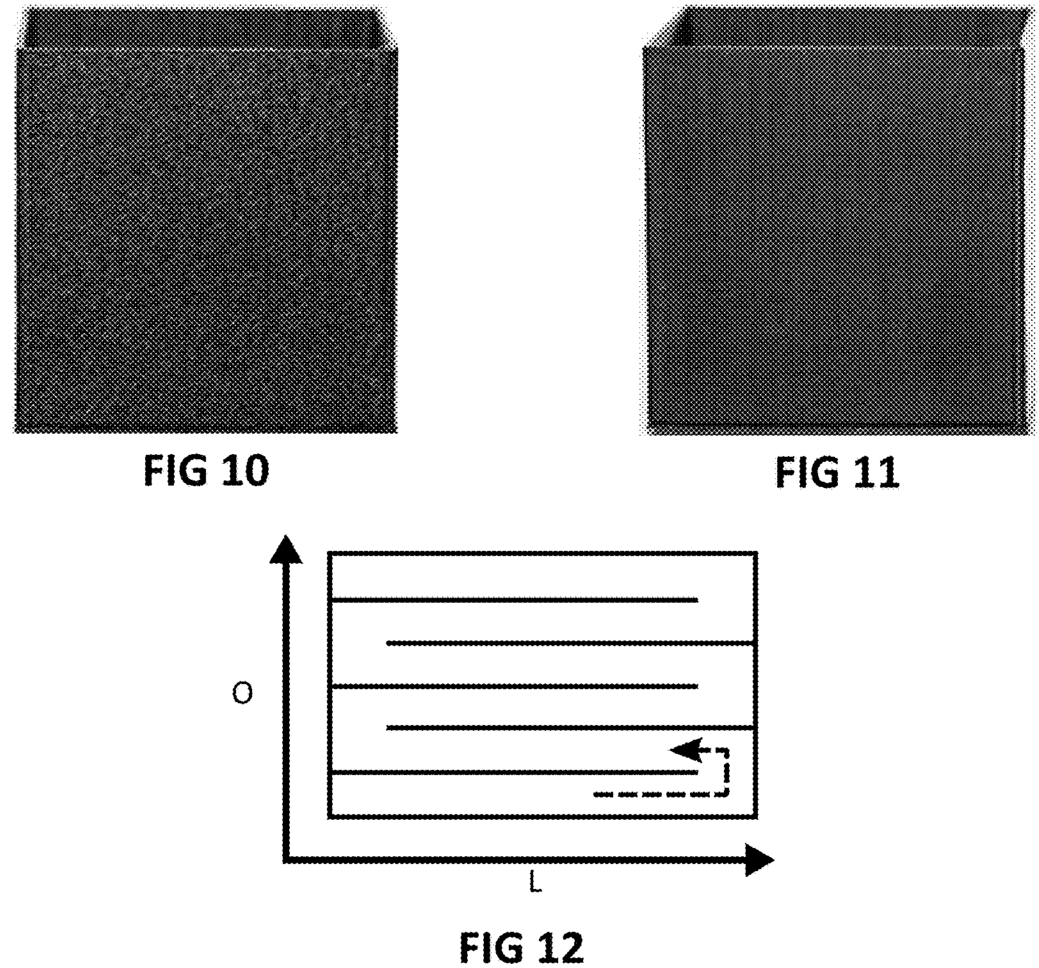
FIG 10
FIG 11
FIG 12
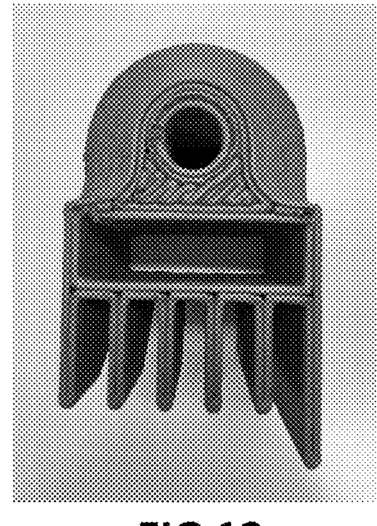
FIG 13
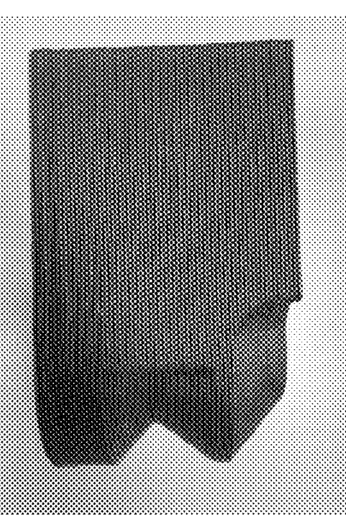
FIG 14
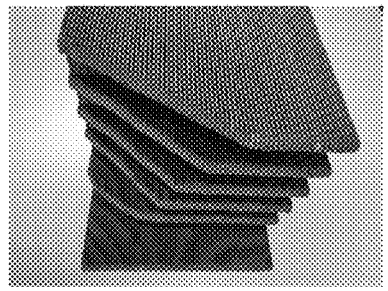
FIG 15

FIG 16
FIG 17
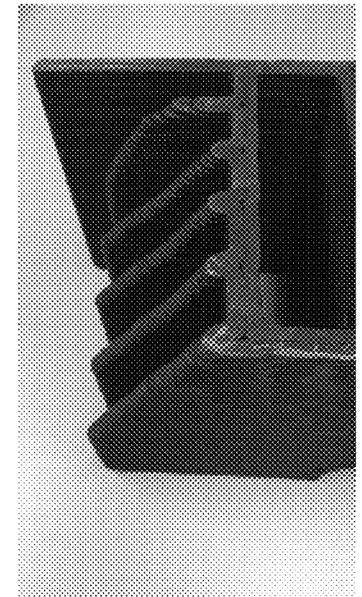
FIG 18
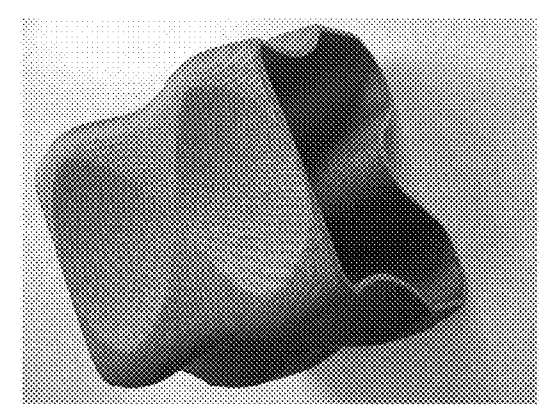
FIG 19
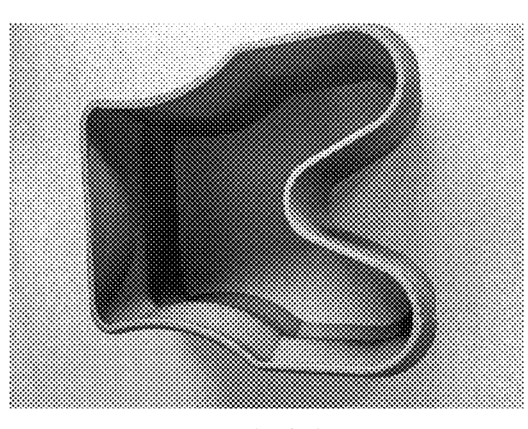
FIG 20
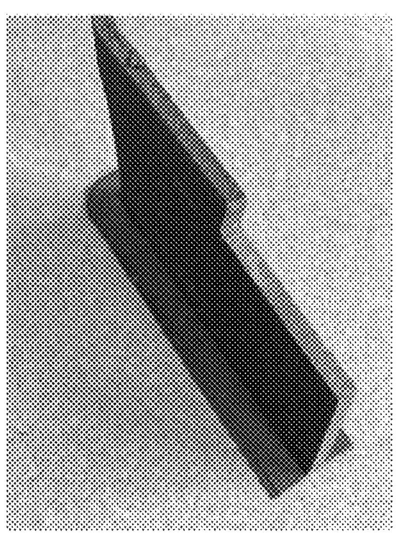
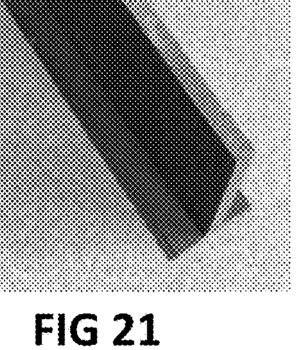
FIG 21
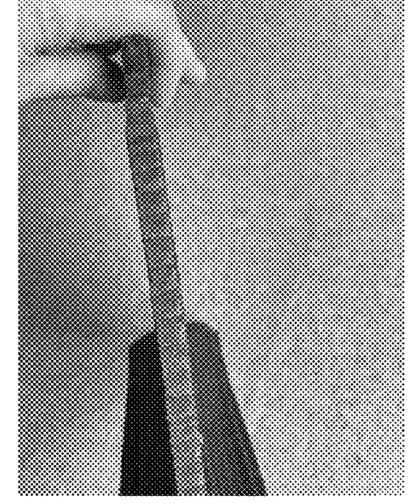
FIG 22

LARGE-SCALE ADDITIVE MANUFACTURING MATERIALS COMPRISING PYROLYZED LIGNOCELLULOSIC FILLER

TECHNICAL FIELD OF THE INVENTION

The present invention relates to additive manufacturing materials, and more in particular to polymer-based additive manufacturing materials for large-scale additive manufacturing and that comprise fillers derived from lignocellulosic biomass.

BACKGROUND OF THE INVENTION

Lignocellulosic biomass (e.g. wood or crops) is a raw material that can be durably grown in large quantities, making it a fairly abundantly available renewable resource with great potential in the ongoing quest for a more sustainable future. Although the main usage of lignocellulosic biomass is still in energy (e.g. by firing with coal) and paper production, the number of other uses continues to increase. For example, there are a growing number of applications where lignocellulosic biomass in powdered form is used, e.g. as a filler in thermoplastic and paper products. Moreover, considerable research remains ongoing to find novel ways to utilize such powdered lignocellulosic biomass, including the enzymatic, chemical, and/or thermochemical transformation thereof for the production of energy and/or chemicals.

Turning the lignocellulosic biomass into powdered form may have typically considerably benefit its storage and conveying properties, as well as its processability and suitability for use in particular applications. However, the fractioning of lignocellulosic biomass into powder in a controlled manner is a relatively complex challenge; not in the least because the lignocellulosic biomass tends to be a composite material both on the macroscopic and microscopic level. Fibres making up the lignocellulosic biomass are typically formed of cellular structures glued together by lignin-rich middle lamellae. Additionally, individual fibres are composites as such since the cell wall is generally composed of variously aligned layers of cellulose microfibrils—cross-linked together by hemicellulose—in a lignin matrix. Moreover, lignocellulosic biomass is rheologically a viscoelastic material. The viscous behaviour causes internal friction, so that most mechanical energy imposed on it is converted into heat.

Natural fibre plastic composites (NFPCs), such as wood-plastic composites (WPCs), are composite materials made of natural fibres (e.g. wood, flax or bamboo) and thermoplastics. They are relatively recent materials that were developed as alternatives to (tropical) hardwood, compared to which they have more possibilities for processing. NFPCs are for instance employed in applications such as patio components, railings, fences, wall decoration panels, etc.

Like many other materials, the printing NFPCs has already been explored in the field of additive manufacturing, though this is still in its early stages. A major drawback however is that problems with blockages and low printing speeds commonly arise. Nevertheless, the potential benefits of NFPCs as a printing material are attractive—such as in terms of strength, durability, etc.—so builders and users of additive manufacturing systems are looking forward to further developments in this area. There is thus still a need in the art for better NFPC-based additive manufacturing materials based.

SUMMARY OF THE INVENTION

It is an object of the present invention to provide good materials for large-scale additive manufacturing. It is a further object of the present invention to provide good uses, methods and products associated therewith. This objective is accomplished by large-scale additive manufacturing materials, uses, methods and products according to the present invention.

It is an advantage of embodiments of the present invention that the additive manufacturing material shows a pronounced effect on the rheology of the material. It is a further advantage of embodiments of the present invention that the products can be printed with fairly high overhang angles (e.g. up to 60° or higher).

It is an advantage of embodiments of the present invention that the additive manufacturing material has a relatively low moisture content and/or uptake. It is a further advantage of embodiments of the present invention that the pyrolyzed (e.g. torrefied) lignocellulosic biomass is more hydrophobic, hence less hydrophilic.

It is an advantage of embodiments of the present invention that well-printed products can be achieved, with good attachment between the different layers and minimal printing faults such as shrinkage, warping, elephant foot, etc.

It is an advantage of embodiments of the present invention that the additive manufacturing material has relatively low viscosity. It is a further advantage of embodiments of the present invention that the product can be printed at a relatively high speed.

It is an advantage of embodiments of the present invention that the pyrolyzed lignocellulosic biomass is more easily ground compared to non-pyrolyzed natural fibres. It is a further advantage of embodiments of the present invention that the pyrolyzed lignocellulosic filler can be easily handled, stored, transported, dosed, processed, compounded, etc. It is yet a further advantage of embodiments of the present invention that the printed product has a good uniformity and/or isotropy.

It is an advantage of embodiments of the present invention that products with a reduced carbon footprint can be printed, as the additive manufacturing material can be an effects carbon sink.

It is an advantage of embodiments of the present invention that the pyrolyzed lignocellulosic filler is fairly thermostable. It is a further advantage of embodiments of the present invention that the pyrolyzed lignocellulosic filler can be compounded at a relatively elevated temperature, e.g. with polymer matrices having a high melting temperature such as polyesters or polyamides. In addition, the resulting thermoplastic composites are reusable for multiple printing cycles, as well as recyclable for other applications. Also, due to the treatment, the materials have a reduced odour and VOC emission, as well as less leaching of contaminants on the equipment (e.g. printer nozzle).

It is an advantage of embodiments of the present invention that a variety of lignocellulosic biomass feedstocks and/or polymer matrices can be used.

It is an advantage of embodiments of the present invention that the resulting material (e.g. thermoplastic composites) has an enhanced "touch and feel experience" in comparison with plastic: brushing gives the effect of wood imitation. It is a further advantage of embodiments of the present invention that the enhanced stiffness and filler implementation has a positive effect on the acoustics of the resulting material.

It is an advantage of embodiments of the present invention that the pyrolyzed lignocellulosic filler have a positive influence on the thermal features of the resulting materials with respect to inorganic fillers or fibres. Lowered thermal conductivity enables faster local heating of material during printing, as well as a slower cooling rate of the entire part, avoiding an excess of residual stress within the polymer matrix.

It is an advantage of embodiments of the present invention that the materials have an elevated heat deflection temperature (HDT) due to the presence of the pyrolyzed lignocellulosic filler, enabling e.g. higher loads of material during a printing process.

In a first aspect, the present invention relates to a use of a material comprising (i) a polymer matrix and (ii) a pyrolyzed lignocellulosic filler dispersed in the polymer matrix, for large-scale additive manufacturing.

In a second aspect, the present invention relates to a method for forming a large-scale additive manufacturing material, the method comprising: (a) providing a pyrolyzed lignocellulosic filler; and (b) compounding the pyrolyzed lignocellulosic filler with a polymer matrix and optional additives.

In a third aspect, the present invention relates to a large-scale additive manufacturing material, comprising (i) a polymer matrix and (ii) a pyrolyzed lignocellulosic filler dispersed in the polymer matrix.

In a fourth aspect, the present invention relates to a method for forming a product (e.g. an article or part) by large-scale additive manufacturing of the large-scale additive manufacturing material according to any embodiment of the third aspect, the method comprising: (a) feeding the large-scale additive manufacturing material into a large-scale additive manufacturing system, and (b) printing the product using the large-scale additive manufacturing system.

In a fifth aspect, the present invention relates to a product obtainable by large-scale additive manufacturing of the large-scale additive manufacturing material according to any embodiment of the third aspect.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 7 is a graph of a sieving analysis (granulometry) of a pyrolyzed lignocellulosic filler used in illustrative embodiments of the present invention.

FIG. 8 schematically depicts the problem of elephant foot in additive manufacturing.

FIG. 9 is a graph showing thermogravimetric analysis (TGA) results in accordance with exemplary embodiments of the present invention.

FIG. 10 is a photograph of a printed part using a moisture containing PA6.

FIG. 11 is a photograph of a printed part using a significantly dried PA6.

FIG. 12 schematically illustrates the printing of a test dumbbell, with indication of the lateral (L) and orthogonal (O) direction.

FIG. 13-FIG. 22 are photographs of three different proof-of-concept printed products (FIG. 13-FIG. 18, FIG. 19-FIG. 20 and FIG. 21-FIG. 22) using a large-scale additive manufacturing materials in accordance with embodiments of the present invention.

Figures 1, 2, 3, 4, 5, 6:
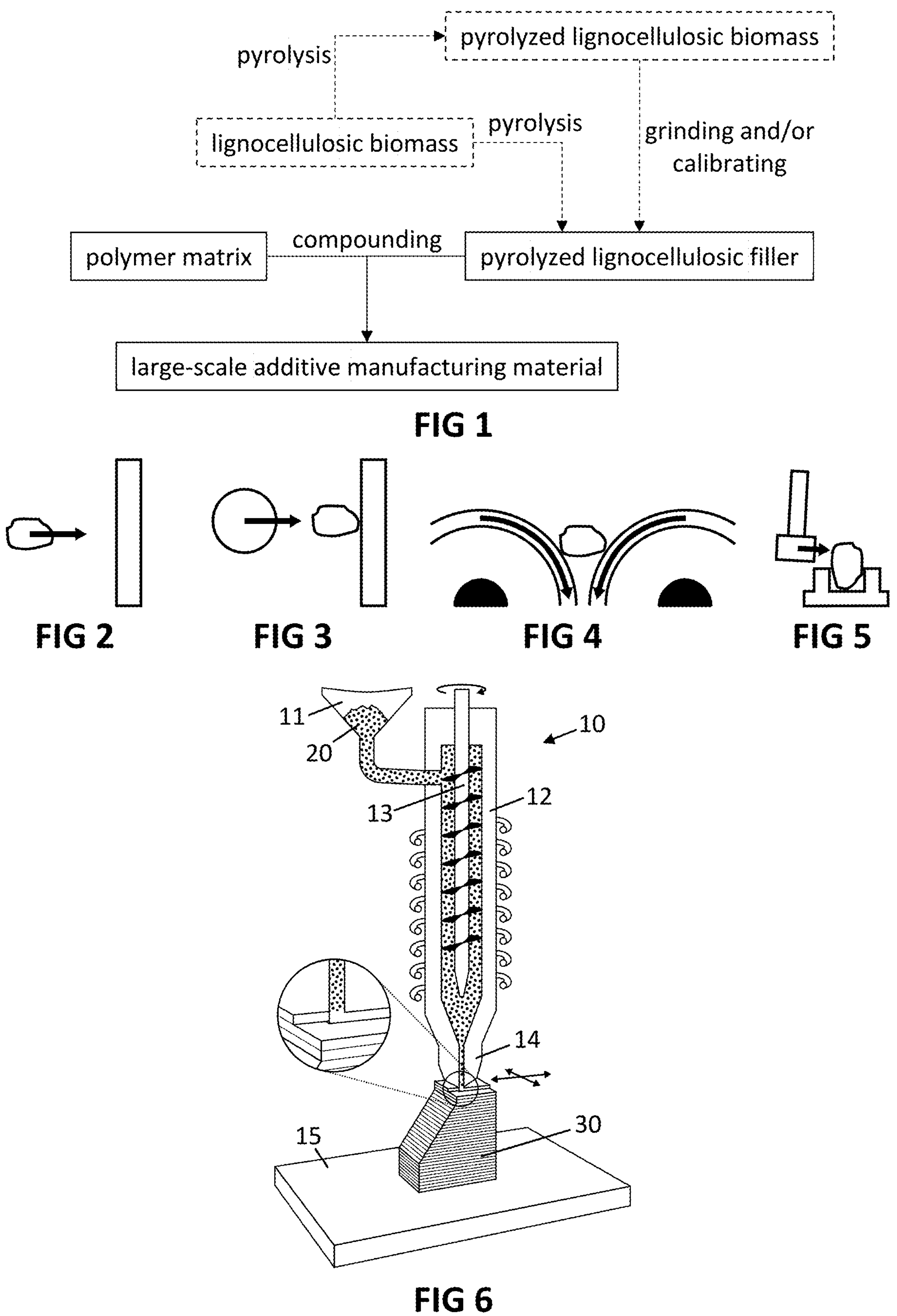
FIG. 1 is a flow chart of a method in accordance with embodiments of the present invention.
FIG. 2-FIG. 5 schematically illustrate different stress types during grinding: single impact (FIG. 2), double impact (FIG. 3), slow compression (FIG. 4), and shearing impact (FIG. 5).
FIG. 6 schematically depicts an additive manufacturing extrusion system.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable with their antonyms under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising means A and B" should not be interpreted as being limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

The following terms are provided solely to aid in the understanding of the invention.

As used herein, and unless otherwise specified, large-scale additive manufacturing is a type of additive manufacturing (also referred to as '3D printing') in which the manufactured product (or 'article') has at least one dimension of 1 m or larger, preferably 1.5 or larger, more preferably 2 m or larger, yet more preferably 2.5 m or larger, most preferably 3 m or larger. For example, the manufactured product may have two—or even three—dimensions (e.g. perpendicular to one another) of 1 m or larger, preferably 1.5 or larger, more preferably 2 m or larger, yet more preferably 2.5 m or larger, most preferably 3 m or larger.

As used herein, and unless otherwise specified, pyrolysis is the process of thermally decomposing a material (e.g. a lignocellulosic biomass) in an inert atmosphere (e.g. under low-oxygen conditions). Different types of pyrolysis may be distinguished, depending on the temperature range used. Herein, pyrolysis up to about 340° C. is referred to as torrefaction. Above 340° C., one may speak of charring (also referred to as 'gasification'), which typically generates a gaseous product (e.g. syngas) and a char (e.g. a biochar). Although the char can be considered a by-product (e.g. a waste product) in some applications (e.g. in syngas production), it is in the context of the present invention the primary gasification product of interest. Both torrefaction and charring have become advanced processes that can be developed into larger, industrial volumes.

In a first aspect, the present invention relates to a use of a material comprising (i) a polymer matrix and (ii) a pyrolyzed lignocellulosic filler dispersed in the polymer matrix, for large-scale additive manufacturing.

In embodiments, the pyrolyzed lignocellulosic filler may be a torrefied or charred lignocellulosic filler. In embodiments, the pyrolyzed lignocellulosic filler may be comprised of particles, such as powder particles or fibres (which may include intact fibres, broken fibres, fused fibres, etc.).

As will also be illustrated in the accompanying examples, the use of a pyrolyzed lignocellulosic filler has several benefits over untreated lignocellulosic filler or no lignocellulosic filler. In additive manufacturing, it is well known that one often must deal with overhangs and bridges which are frequently difficult to print. Especially as the angle of e.g. the overhang increases, support from the underlying layer increasingly diminishes and the structure becomes prone to curling, delamination, sagging and/or collapsing. One of the means for improving the feasible overhang angle is to use composites in which fibrous fillers are added to the polymer matrix. Such fibrous fillers can enhance the strength of the printing material after extrusion and before solidification, thereby not only increasing the maximum overhang angle that can be achieved but also reducing other printing defects such as elephant foot (FIG. 8). Moreover, they can also enhance the final product (e.g. increasing the stiffness thereof). It was surprisingly found within the present invention that pyrolyzed lignocellulosic fillers are particular suited for that purpose. More specifically, it was observed that a significant so-called Bingham effect can be achieved using composites based on these pyrolyzed lignocellulosic fillers; i.e. they behave as a rigid body at low stress and require a minimum shear rate before behaving as a viscous fluid. When this minimum is exceeded during printing, but not achieved after positioned on the print bed—as is observed for additive manufacturing materials in accordance with the present invention—a particularly advantageous solution is achieved. Additionally, the pyrolyzed lignocellulosic fillers also have a thickening effect on the composite. Both the Bingham and thickening effect significantly improve the rheology of the composite.

Furthermore, lignocellulosic fillers are a natural carbon-based product the incorporation of which in a printed product advantageously acts as a carbon sink. It is known that the need for such carbon sinks is ever-growing and expanding to more and more fields, including e.g. the construction industry. As such, the instant large-scale additive manufacturing materials can be particularly beneficial in that respect. Lignocellulosic fillers are moreover lighter and have a higher specific strength than other common fibrous reinforcement materials (e.g. steel, carbon fibre or glass fibre).

When lignocellulosic fillers are used in a (large-scale) additive manufacturing material, the moisture absorption and content are of value because moisture interferes significantly in a printing process. Indications of possible moisture content in failed printing and printed products may for example include: holes in the printed products (e.g. in their top); printed products become soft, fragile, and break easily; repeated builds seem inconsistent or fail without apparent changes in variables (i.e. issues with reproducibility); the material cracks or makes popping noises as the materials is pushed through the nozzle; the extruder tip bubbles with a tiny burst of steam; the printed material does not or badly adheres to the print bed; the extruder stops but printing material keeps coming out; the extruder motor starts but the extrusion is delayed; the extruder jams; etc. FIG. 10 and FIG. 11 for example show photographs of printed parts obtained using a moisture containing PA6 and a significantly dried PA6, respectively. Consequently, pyrolyzed lignocellulosic fillers that are characterized by a low moisture content and a limited moisture absorption—which is particularly true for torrefied lignocellulosic fillers, which are generally hydrophobic in nature—, have an advantage over e.g. untreated lignocellulosic fillers which typically have a considerable moisture content and adsorption. In combination with the above-described rheologic effect, the instant additive manufacturing materials advantageously allow to print products with good layer-to-layer adhesion and minimal shrinkage and/or warping; as is for instance evident from FIG. 13-FIG. 22.

Compared to untreated lignocellulosic fillers, pyrolyzed lignocellulosic fillers also feature a considerably higher thermostability, allowing them to be compounded at a higher temperature. This is particularly interesting in the case of polymer matrices having a higher melting temperature, such as polyamides and/or polyesters. Notwithstanding that any pyrolyzed lignocellulosic fillers may typically show at least some improved thermostability over untreated lignocellulosic fillers, this effect is particularly notable when the pyrolysis is performed at a temperature of 320° C. or higher, such as from 320 to 800° C. or from 400 to 700° C. Without being bound by theory, the fibres undergo—compared to pyrolysis at lower temperatures—more alteration at higher temperature and lose more volatile organic compounds (VOC's) in the process, yielding lignocellulosic fillers with markedly improved thermal stability.

An additional challenge for printing with composites is the assurance of uniform and isotropic properties in the final product. Also in this respect, fillers from pyrolyzed lignocellulosic biomass are advantageous as such a pyrolyzed biomass is more readily ground into smaller particles. Moreover, pyrolyzed lignocellulosic fillers were found to be less cohesive than untreated lignocellulosic fillers; this was—without being bound by theory—tentatively attributed to their morphological structure and/or lower polarity (e.g. less surface hydroxyl groups). Both the smaller particle size and reduced cohesion result in a reduced tendency for orientation (e.g. in a melt flow) and improved ability to be spread out evenly throughout the polymer matrix, in turn considerably benefiting the uniformity and isotropy of the printed product.

In embodiments, the polymer matrix may be selected from a thermoplastic polymer or thermosetting polymer. In embodiments, the thermoplastic polymer or thermosetting polymer may be either rigid or elastomeric. In embodiments, the thermoplastic polymer may be a polyolefin (e.g. polyethylene (PE) or polypropylene (PP)); thermoplastic elastomer (TPE); polyvinyl chloride (PVC); styrene-based copolymer (e.g. acrylonitrile butadiene styrene (ABS), styrene acrylonitrile resin (SAN) or acrylonitrile styrene acrylate (ASA)); polyamide (e.g. nylon 6 (PA6), nylon 66 (PA66), nylon 666 (PA 666), nylon 12 (PA12) or an aromatic polyamide); polyester (e.g. polyethylene terephthalate (PET), polybutylene terephthalate (PBT) or a copolymer thereof; polyethylene 2,5-furandicarboxylate (PEF) or polylactic acid (PLA)); polyhydroxyalkanoate (PHA); polyacetal (POM); polycarbonate (PC) or polysulfone (e.g. polyethersulfone (PES)). In embodiments, the material may be a blend of thermoplastics, e.g. a thermoplastic elastomeric blend. In embodiments, the thermosetting polymer may be a phenolic resin, epoxy resin, polyester, polyurea or polyurethane.

In embodiments, the large-scale additive manufacturing may be a granular material, such as pellets, granules or powder. In embodiments, the large-scale additive manufacturing may be a granular material-based additive manufacturing. Although in principle usable for small-scale additive manufacturing, it was surprisingly found within the present invention that the instant manufacturing materials are particularly suited for large-scale additive manufacturing. For example, they lend themselves particularly well to being formulated into granular materials having a particle size in the order of milli- or centimetre. Moreover, —in large-scale additive manufacturing—considerable weight is exerted by the overlying layers of printing material on the underlying layers. Higher weight means higher shear stress and therefore higher shear rate, which in turn leads to more deformation (e.g. elephant foot, warping, shrinkage, etc.). As such, typical printing materials for small-scale additive manufacturing are unsuited for large-scale additive manufacturing. However, it was presently found that the use of pyrolyzed lignocellulosic fillers advantageously strengthens the additive manufacturing material formulated therewith (cf. supra), making it particularly suited for large-scale additive manufacturing. In embodiments, the granular material-based additive manufacturing may be a fused granular fabrication (FGF) (also referred to as fused particle fabrication (FPF)) or powder bed fusion (PBF). Fused particle fabrication of granular fabrication is an additive manufacturing method in which melted plastic granules are deposited on a bed layer by layer to form a printed product. During this process, plastic granules are supplied to a (vertical) extrusion screw that rotates, heats and presses the granules down to a molten homogeneous plastic mass. The mass is pressed through a nozzle, where the flow is controlled by the diameter and shape of the passage. After each layer, the building platform is typically lowered (or the nozzle lifted), and the next layer is added. If necessary, a supporting structure is also printed to allow overhangs; post-processing in the form of removal of these support structures is then typically required. In powder bed fusion, a thin layer of granular material (i.e. not limited to powders) is spread over a print bed and an energy source (e.g. a laser or electron beam) is used to locally bond the granular material together. Next, a new layer of powder is spread over the previous layer and the process is repeated, building up the product layer by layer. At the end of the process, any unfused powder is removed in post processing. During printing the unfused powder may advantageously help to support overhangs.

In embodiments, any feature of any embodiment of the first aspect may independently be as correspondingly described for any embodiment of any of the other aspects.

In a second aspect, the present invention relates to a method for forming a large-scale additive manufacturing material, the method comprising: (a) providing a pyrolyzed lignocellulosic filler; and (b) compounding the pyrolyzed lignocellulosic filler with a polymer matrix and optional additives. A flow chart of the method—including certain optional steps (cf. infra)—is shown in FIG. 1.

In embodiments, the pyrolyzed lignocellulosic filler may have an average particle size between 1 and 5000 μm, preferably between 5 and 1000 μm, more preferably between 10 and 750 μm, yet more preferably between 20 and 500 μm, most preferably between 30 and 250 μm. In embodiments, the pyrolyzed lignocellulosic filler may have a maximum particle size between 1000 and 10000 μm, preferably between 2000 and 5000 μm. In embodiments, the pyrolyzed lignocellulosic filler may have a particle size distribution such that at least 90—preferably at least 95%—of the particles have a particle size between 1 and 5000 μm, preferably between 5 and 1000 μm, more preferably between 10 and 750 μm, yet more preferably between 20 and 500 μm, most preferably between 30 and 250 μm. Pyrolyzed lignocellulosic biomass is generally advantageously more brittle and therefore more easily ground (cf. infra) than untreated lignocellulosic biomass, so that the particles sizes (e.g. average, minimum and/or maximum particle size, and/or particle size distribution) of the former are typically smaller than that of the latter. Viewed from another angle: for a given target particle size, the enhanced brittleness entails that less energy (e.g. half, cf. infra) is needed to grind the pyrolyzed lignocellulosic biomass compared to untreated lignocellulosic biomass. This has a significant impact on the grinding process, as industrial grinders can be operated automatically and cost comparatively little with respect to the volumes they can process over their lifetime, but their energy consumption remains a considerable economic factor.

In embodiments, step b may comprise compounding from 0.1 to 65 wt % of the pyrolyzed lignocellulosic filler with the polymer matrix and optional additives, preferably from 1 to 60 wt %, more preferably from 5 to 50 wt %, yet more preferably from 10 to 40 wt %, most preferably from 20 to 30 wt %.

In embodiments, step a may comprise: (a1) pyrolyzing a lignocellulosic biomass. In embodiments, pyrolyzing the lignocellulosic biomass may be performed at a temperature of from 220 to 1000° C., preferably 230 to 900° C., more preferably from 240 to 850° C., yet more preferably from 250 to 800° C. In embodiments, pyrolyzing the lignocellulosic biomass may be performed for a duration of from 10 min to 5 hours, preferably from 15 min to 4 hours, more preferably from 20 min to 3 hours, most preferably from 25 min to 2 hours, such as from 30 min to 45 min or 45 min to 1 hour.

In preferred embodiments, pyrolyzing the lignocellulosic biomass may be torrefying the lignocellulosic biomass. Torrefying the lignocellulosic biomass may for example be performed at a temperature of from 220 to 340° C., preferably from 240 to 320° C., more preferably from 250 to 310° C., e.g. 285 or 290° C. In other embodiments, pyrolyzing the lignocellulosic biomass may be charring (i.e. gassing) the lignocellulosic biomass. Charring the lignocellulosic biomass may for example be performed at a temperature of from 400 to 1000° C., preferably 500 to 900° C., more preferably 600 to 850° C., yet more preferably 700 to 800° C. In particular embodiments, pyrolyzing the lignocellulosic biomass may comprise first torrefying the lignocellulosic biomass and subsequently charring the lignocellulosic biomass. In these embodiments, each of the torrefying and charring may be performed for a duration as described above (e.g. from 10 min to 5 hours, etc.) and at a respective temperature as described above. For example, the lignocellulosic biomass may be first torrefied at 290° C. for between 30 and 45 min and subsequently charred at about 700° C. for about 15 min. In doing so, the torrefaction can function as a pre-treatment step which better homogenizes the lignocellulosic biomass and prepares it for an improved gasification/charring. Such a charring of torrefied lignocellulosic biomass can then advantageously be done more efficiently, yielding a more homogeneous, higher quality char. This higher quality char may for example comprise less VOC's (cf. supra), be (even) easier to grind down, have a low density, have a better UV-resistance, be more thermostable. Among others, a low VOC content may for instance be advantageous in the context of automotive interior applications. Similarly, a low density is particularly advantageous where the product mass is of interest, such as in composites for automotive applications.

In embodiments, the lignocellulosic biomass may be selected from wood (e.g. hardwood, softwood, recycled wood, etc.), flax (e.g. flax shives) or bamboo.

In embodiments, step a may further comprise: (a2) grinding the pyrolyzed lignocellulosic biomass obtained to obtain the pyrolyzed lignocellulosic filler.

Several techniques are available for the fine grinding of lignocellulosic biomass: impact mills, ball media mills, air jet mills, roller mills, disc mills, etc. Impact mills and air jet mills are based on single impacts (FIG. 2), while ball media mills utilize double impacts between metal surfaces (FIG. 3). Roller mills are based on compression (FIG. 4) and disc mills on shearing impacts (FIG. 5). Mechanical grinding of lignocellulosic biomass in general typically leads to a fine particle size, various particle shapes (particle size distribution), high specific surface area, and sometimes low cellulose crystallinity, depending on the energy and grinding mechanism applied as well as the grinding conditions and raw material properties. Hence, there can be several advantages to having lignocellulosic biomass ground: better handleability, storage and transport; improved quality control; facilitated mixability with other materials and after treatment; and/or enhanced processability. For example, well-ground lignocellulosic biomass can in step b easily be dosed and implemented into a compounding unit. It is in that respect particularly advantageous that pyrolyzing the lignocellulosic biomass increases its brittleness, thereby increasing the ease with which it is ground and/or further reducing the particle size (and/or distribution) to which it can be ground.

In embodiments, step a may further comprise: (a3) calibrating the pyrolyzed lignocellulosic biomass obtained to obtain a selected average particle size and/or a selected particle size distribution. Calibrating the pyrolyzed lignocellulosic biomass may for example comprise sieving it.

In embodiments, the optional additives may be one or more selected from the list of an oxidative and/or thermal stabilizer (e.g. a phenolic compound and/or a phosphite), UV-stabilizer, hydrolysis stabilizer (e.g. a carbodiimide), chain extender (e.g. an epoxy derivative), paraffin, further filler ($CaCO_3$ or talc), coupling agent (e.g. a maleic anhydride (MA)-modified compound), lubricant (e.g. stearic acid derivative) and adhesion promoter (e.g. Rosin Ester, polyisobutylene (PIB) or a derivative thereof, or a thermoplastic polyurethane (TPU)).

In embodiments, any feature of any embodiment of the second aspect may independently be as correspondingly described for any embodiment of any of the other aspects.

In a third aspect, the present invention relates to a large-scale additive manufacturing material, comprising (i) a polymer matrix and (ii) a pyrolyzed lignocellulosic filler dispersed in the polymer matrix.

In embodiments, the material may be a granular material.

In embodiments, any feature of any embodiment of the third aspect may independently be as correspondingly described for any embodiment of any of the other aspects.

In a fourth aspect, the present invention relates to a method for forming a product (e.g. an article or part) by large-scale additive manufacturing of the large-scale additive manufacturing material according to any embodiment of the third aspect, the method comprising: (a) feeding the large-scale additive manufacturing material into a large-scale additive manufacturing system, and (b) printing the product using the large-scale additive manufacturing system. In embodiments, the large-scale additive manufacturing system may be an extrusion system or a powder bed fusion system. In embodiments, the extrusion system may comprise an extrusion screw. In embodiments, the extrusion screw may be a vertical or horizontal extrusion screw. An example of such an extrusion system is schematically depicted in FIG. 6, showing the extrusion system 10 comprising a hopper filled with granular large-scale additive manufacturing 20, heated cylinder 12, rotating Archimedes screw 13 and moving extrusion nozzle 14 for additively manufacturing a printed product 30 on building platform 15.

In embodiments, any feature of any embodiment of the fourth aspect may independently be as correspondingly described for any embodiment of any of the other aspects.

In a fifth aspect, the present invention relates to a product obtainable by large-scale additive manufacturing of the large-scale additive manufacturing material according to any embodiment of the third aspect.

In embodiments, any feature of any embodiment of the fifth aspect may independently be as correspondingly described for any embodiment of any of the other aspects.

The invention will now be described by a detailed description of several embodiments of the invention. It is clear that other embodiments of the invention can be configured according to the knowledge of the person skilled in the art without departing from the true technical teaching of the invention, the invention being limited only by the terms of the appended claims.

Example 1: Preparation of Lignocellulosic Filler

Lignocellulosic Biomass

Different types of lignocellulosic biomass feedstock were used, such as various types of wood (e.g. hardwood, softwood, recycled wood, etc.), flax shives or bamboo. The feedstock was delivered as continuous fibres, chips, kernels or solid blocks. The average moisture uptake varied depending on the origin and nature of the lignocellulosic biomass, typically within the range of 8-60%. For example, a commercial lignocellulosic biomass feedstock could be used of which supplier target specifications for the particle size distribution are as follows: max 3 wt %>50 mm, max 10 wt %<5.0 mm, min 30 wt % 5.0 mm<P<15 mm, and max 60 wt % 15 mm<P<50 mm. Prior to pyrolysis, the lignocellulosic biomass was ground to a maximum size of 0.1-50 mm.

Pyrolysis

Pyrolysis—i.e. either torrefaction or charring—was performed in an advanced industrial installation with programmable conditions, including atmospheric composition (e.g. a low-oxygen inert atmosphere), pressure and temperature (in between ambient temperature and 900° C.) for up to 3 hours. In the case of torrefaction, the pyrolysis temperature was typically in the range of 250-310° C.; for charring, it was typically in the range of 700-900° C. For example, one illustrative type of a lignocellulosic filler was obtained by torrefying lignocellulosic biomass at 290° C. for between 30 and 45 min. A second illustrative type of lignocellulosic filler was obtained by first torrefying at 290° C. for between 30 and 45 min and subsequently charring at about 700° C. for 15 min. After pyrolysis, the heat-treated lignocellulosic biomass was optionally pelletized to cylindrical or square pellets with sizes varying from 5-20 mm in radius and 0.1-100 mm in length.

Material Properties

Thermogravimetric analysis (TGA) and thermal decomposition measurements were performed on various pyrolyzed lignocellulosic biomass samples and revealed that the pyrolyzed lignocellulosic biomass samples have a better thermal stability than comparable untreated (e.g. pristine) lignocellulosic biomass.

TGA pas performed by—for each sample—pre-heating from room temperature to 200° C. in about 10 min and subsequently steadily heating up from 200° C. to 300° C. at a rate of 10° C./min in a standard atmosphere (±80% $N_2$ and 20% $O_2$) and meanwhile registering the mass of the sample. The results are summarized in FIG. 9 and the table below. The solid curves in FIG. 9 show the TGA profile of the different samples—with the reference signs as indicated in the table below—while the dashed line corresponds to the temperature ramp that was used. 'Char 800° C.' was a wood flour sample that had first been torrefied and then charred at 800° C.; it was subsequently ground and calibrated. 'Char B6', 'Char F' and 'Char T6' were traditionally produced biochars (i.e. in one step, without prior torrefaction) formed at different temperatures and which were not grinded.

| | Mass reduction | |
|---|---|---|
| | up to 200° C. | between 200 and 300° C. |
| Wood flour (1) | 6.89% | 11.05% |
| Char 800° C. (2) | 3.90% | 0.65% |
| Char B6 (3) | 3.21% | — |
| Char F (4) | 6.90% | — |
| Char T6 (5) | 4.45% | — |

As can be seen, all samples lose some mass at the beginning of the experiment. However, since no burning/decomposition occurs at these temperatures, this was considered an artefact attributed to small, light particles blowing out of the measuring cup. In the region of 200-300° C., only the untreated wood flour sample showed an appreciable reduction in mass; while the charred samples (i.e. both 1- and 2-step) showed no measurable—within the experimental error—reduction. A small reduction in mass is indicative of a lower content of VOC's in the sample. Overall, pyrolyzed—and particularly charred—samples thus show a high degree of thermal stability.

For the thermal decomposition measurements, torrefied and charred samples were subjected to a longer thermal decomposition of 30 min at three different temperatures in a standard atmosphere (±80% $N_2$ and 20% $O_2$). The results were as follows:

| | Residue after thermal decomposition (wt %) | |
|---|---|---|
| | Poplar torrefied at 285° C. | Wood residue charred at 800° C. |
| 270° C. | 30.5 | 62.6 |
| 250° C. | 31.9 | 84.9 |
| 200° C. | 42.6 | 95.8 |

where the residue corresponds to the amount of sample left after the thermal decomposition treatment, expressed relative to the sample mass prior at the start of the experiment (100%). The results show that for these longer exposures to elevated temperatures, more mass loss takes place; and increasingly so for higher temperatures. As expected, the charred sample was comparatively less affected, since more of its biomass had already been gassed out during its pyrolysis treatment. Nevertheless, these results compare favourably to similar experiments on untreated lignocellulosic biomass, again illustrating that the thermal stability is improved by pyrolyzing the lignocellulosic biomass.

It was moreover observed that pyrolyzed (i.e. torrefied and/or charred) lignocellulosic biomass absorbs less moisture than untreated lignocellulosic biomass in identical circumstances. The maximum moisture contents out of the process was for example about 0-2% at ambient conditions for torrefied lignocellulosic biomass samples, compared to up to 60% for fresh untreated lignocellulosic biomass (e.g. poplar wood chips). Within the class of pyrolyzed lignocellulosic biomass, charred lignocellulosic biomass was found to typically take up more water than over time than torrefied lignocellulosic biomass. This was attributed to the torrefied lignocellulosic biomass being (more) hydrophobic. By contrast, charred lignocellulosic biomass typically has more hygroscopic characteristics; for example due to its morphology (e.g. macro- and micropores therein).

Both torrefied and charred lignocellulosic biomass generally revealed an enhanced brittleness, which greatly facilitated the grinding process (cf. infra). This could be quantified as the energy per kg material that needs to be exerted to achieve a selected average particle size and/or particle size distribution. Compared to untreated lignocellulosic biomass, an energy consumption reduction of 50% was typically observed during grinding of pyrolyzed lignocellulosic biomass; i.e. the energy per kg material needed to achieve the same average particle size and/or particle size distribution typically halved.

Grinding and Sieving

Pyrolyzed lignocellulosic biomass (e.g. powder or pellets) were ground to an average size varying from about 0.1 to 1000 μm and with a maximum length of 10000 μm. Different grinding technologies (cf. supra) have been successfully applied, such as pin milling. Subsequently particles having a size larger than 5000 μm were removed by sieving. The sieving process could be conducted with varying techniques, such as a classifier. The particle size and distribution were determined with an air jet sieve. Granulometry results of a typical pyrolyzed lignocellulosic filler used for compounding (cf. infra) are depicted in FIG. 7.

Example 2: Compounding of Pyrolyzed Lignocellulosic Filler with a Polymer Matrix Lignocellulosic fibres in accordance with Example 1 were added as fillers to various polymer materials.

Polymer Matrix

Polypropylene (PP) with a melt flow rate of 16.5 (230° C., 2.16 kg, ISO 1133) and heat deflection temperature (HDT) of 85° C. (ISO 75-2/9) was used. Acrylonitrile butadiene styrene (ABS) with a melt flow rate of 15 (220° C., 10 kg, ISO 1133) and heat deflection temperature (HDT) of 100° C. (118 MPa, ISO 75-2A) was used. Nylon 6 (PA6) (H 24 grade) with a viscosity number of 243 cm 3/g (ISO 307, 1157, 1628) and melt viscosity of 2250 Pa·s (260° C.) was used. Polyethylene terephthalate (PET) with an intrinsic viscosity of 0.78-0.82 (ISO 1628-5) and glass transition temperature of 80° C. (ASTM D3410) was used. All materials were dried according to the guidelines of the technical data sheets, prior to compounding.

Equipment

For the compounding experiments, a twin screw compounder with L/D=36 and a barrel size (screw diameter) of 18.5 mm was used. Processing temperatures (melt temperatures) used were each time selected in accordance with the polymer manufacturer's recommendations (e.g. in the range of 195-275° C.). Other parameters for the compounder were generally selected/optimized in function of the materials to be compounded, as is common in the art. Typical values are for example as follows: feed rate of 1.5-2.5 kg/h, screw speed of 100-200 rpm, melt pressure of 15-71 bar, extruder load of 20-72% and vacuum of 0.1-0.5 bar.

Illustrative Formulations

During the compounding experiments, various combinations of different lignocellulosic biomass feedstock, pyrolysis treatment (torrefaction, charring and untreated) and fillers loadings have been composed, utilizing different polymer matrices and additives. A few typical formulations are listed below.

Polyolefin-based natural fibre plastic composites (NFPCs) were formulated using 10-95 wt % PP with MFI 15 (also containing oxidative and UV-stabilizers), 0-5 wt % thermal stabilizer, 0-7.5% paraffin, 1-65 wt % pyrolyzed lignocellulosic filler, 0-30 wt % further filler (e.g. $CaCo_3$, Talc), 0-10 wt % coupling agent (e.g. maleic anhydride (MA)-modified), 0-10 wt % lubricant (e.g. a stearic acid derivative) and 0-10 wt % adhesion promotor (e.g. Rosin Ester, polyisobutylene (PIB) or a derivative thereof, or a thermoplastic polyurethane (TPU)). A typical processing temperature was 240° C.

ABS-based NFPCs were formulated using 10-95 wt % ABS with melt flow index (MFI) 15 (also containing oxidative, thermal and UV-stabilizers), 1-65 wt % pyrolyzed lignocellulosic filler, 0-30 wt % further filler (e.g. $CaCo_3$, Talc), 0-10 wt % coupling agent (e.g. maleic anhydride (MA)-modified), 0-10 wt % lubricant (e.g. a stearic acid derivative) and 0-10 wt % adhesion promotor. A typical processing temperature was 240° C.

PA6-based NFPCs were formulated using 10-95 wt % PA6 (also containing oxidative and UV-stabilizers), 0-5 wt % thermal stabilizer, 0-7.5 wt % chain extender, 1-65 wt % pyrolyzed lignocellulosic filler, 0-30 wt % further filler (e.g. $CaCo_3$, Talc), 0-10 wt % coupling agent (e.g. maleic anhydride (MA)-modified), 0-10 wt % lubricant (e.g. a stearic acid derivative) and 0-10 wt % adhesion promotor. A typical processing temperature was 250° C.

PET-based NFPCs were formulated using 10-95 wt % PET (also containing hydrolysis, oxidative—e.g. phosphites—and UV-stabilizers), 0-5 wt % thermal stabilizer, 0-7.5 wt % chain extender (e.g. a carbodiimide), 1-65 wt % pyrolyzed lignocellulosic filler, 0-30 wt % further filler (e.g. $CaCo_3$, Talc), 0-10 wt % coupling agent (e.g. maleic anhydride (MA)-modified), 0-10 wt % lubricant (e.g. a stearic acid derivative) and 0-10 wt % adhesion promotor. A typical processing temperature was 250° C.

PLA-based NFPCs were formulated using 10-95 wt % PLA (also containing hydrolysis, oxidative—e.g. phosphites—and UV-stabilizers), 0-5 wt % thermal stabilizer, 0-7.5 wt % chain extender (e.g. a carbodiimide), 1-65 wt % pyrolyzed lignocellulosic filler, 0-30 wt % further filler (e.g. $CaCo_3$, Talc), 0-10 wt % coupling agent (e.g. maleic anhydride (MA)-modified), 0-10 wt % lubricant (e.g. a stearic acid derivative) and 0-10 wt % adhesion promotor.

Compound Properties

The material properties of the NFPCs were tested for formulations as described above with 30 wt % pyrolyzed lignocellulosic filler (simply referred to as 'filler' in the subsequent tables) and illustrative results are shown in the table below. More in particular, the pyrolyzed lignocellulosic filler in each of the experiments related to compounding and printing described below was a lignocellulosic filler that had been torrefied at 290° C. for between 30 and 45 min. Alternatively, — although the results thereof are not discussed in detail below—similar tests were done with lignocellulosic biomass which was first torrefied at 290° C. for between 30 and 45 min and subsequently charred at about 700° C. for 15 min. The materials testing was done in an accredited laboratory, according to the corresponding international standards. The NFPCs as such (i.e. not only the pyrolyzed lignocellulosic fillers used therein) showed a reduced moisture absorbance, compared to NFPCs based untreated lignocellulosic fillers. In addition, the brittleness of pyrolyzed lignocellulosic fillers was not only advantageous for grinding (cf. supra) but also facilitated the compounding process and the homogeneity of the compounds during manufacture.

| | Matrix material (+30 wt % filler) | | | |
|---|---|---|---|---|
| | PP | ABS | PA6 | Test method |
| Flexural modulus (MPa) | 3300 | 2880 | 4500 | ISO 178 |
| Shrinkage (%) | 1.0 | 1.6 | 1.0 | ISO 292 |
| Tensile strength | 31.4 | 31 | 71.5 | ISO 527 |
| Young modulus (MPa) | 3300 | 3500 | 4200 | ISO 527 |
| Moisture absorption (%) | 1 | 0.9 | 1.9 | 24 h immersion/25° C. |
| MFI | 23.5 (230° C.) | 3.2 (220° C.) | 16.7 (275° C.) | ISO 1133 (5 kg load) |
| HDT (° C.) | 102 | 115 | 127 | ISO 75 |
| Impact test (kJ/m$^2$) | 1.6 | 2.7 | 2.9 | ISO 180 Notch A |

Example 3: Use as an Additive Manufacturing Material

To print the NFPCs, a standard additive manufacturing extrusion machine with a build area of 2000 mm×2000 mm and a build height of 1500 mm was used. A print speed of 100 mm/s with a nozzle of 7.0 mm was used, in combination with a layer height of 2.0 mm. The materials were then tested on their rheological and printing behaviour. The measurements showed several remarkable effects. Photographs of a couple of different proof-of-concept printed products are shown in FIG. 13-FIG. 18, FIG. 19-FIG. 20 and FIG. 21-FIG. 22. Strikingly, even while the different layers remained distinctly visible outwardly in the printed products, the internal isotropy was notably improved (cf. infra).

First, NFPCs based on pyrolyzed lignocellulosic fillers showed significant differences in rheology comparable to NFPCs based on untreated lignocellulosic fillers with an equivalent average particle size and particle size distribution. More specifically: the viscosity was lower for an identical shear stress and melt temperature. Evidently, the pyrolyzed lignocellulosic filler has a lubricating effect in the derived composite.

Secondly, the pyrolyzed lignocellulosic filler-based NFPCs display a so-called Bingham effect; i.e. they behave as a rigid body at low stress, but as a viscous fluid at high stress. To illustrate this, capillary rheology was used to measure the minimum shear stress needed to create a melt flow in function of the amount of pyrolyzed lignocellulosic fillers in the different NFPCs; results of which are shown in the table below.

| | Minimum shear rate (1/s) | | |
|---|---|---|---|
| Matrix material | PP | ABS | PA6 |
| Measuring temperature (° C.) | 200 | 210 | 230 |
| 10 wt % filler | 30 | 20 | 40 |
| 20 wt % filler | 70 | 60 | 95 |
| 30 wt % filler | 210 | 150 | 310 |

As can be seen, the minimum shear stress was in each case higher at 20 wt % pyrolyzed lignocellulosic filler compared to 10 wt %, and still higher at 30 wt %. The Bingham effect and the lowered viscosity in comparison with unreinforced materials in turn result in a higher achievable overhang angles in the printed product. Maximum overhang angles in function of the pyrolyzed lignocellulosic filler content were therefore measured and are outlined in the following table.

| | Maximum overhang angle (°) | | |
|---|---|---|---|
| Matrix material | PP | ABS | PA6 |
| 0 wt % filler | 40 | 38 | 44 |
| 10 wt % filler | 47 | 49 | 52 |
| 30 wt % filler | 52 | 52 | 59 |

Due to the effect of the fillers on the rheological features of material, the maximum overhang angle follows the same trend as for the minimum shear rate, increasing in each case from 0 wt % over 10 wt % to 30 wt % pyrolyzed lignocellulosic filler.

Thirdly, the isotropy of the printed product was improved by incorporating pyrolyzed lignocellulosic filler (e.g. compared to untreated lignocellulosic filler) into the matrix material. To test the isotropic quality of printed products, a square of 20 cm by 20 cm was printed with a monolayer structure; as schematically depicted in FIG. 12. Subsequently, testing dumbbells for measuring the mechanical properties were fabricated by cutting laterally (L) and orthogonally (O) in relation to the main printing orientation (dashed arrow). The tables below illustrate the impact of the average particle size on the isotropic performance in terms of tensile strength of NFPCs with varying pyrolyzed lignocellulosic filler.

| | Matrix material: ABS; average particle size: 150 μm Tensile strength (MPa) | |
|---|---|---|
| | Lateral cut | Orthogonal cut |
| 10 wt % filler | 38 | 30 |
| 20 wt % filler | 35 | 30 |
| 30 wt % filler | 31 | 25 |

| | Matrix material: ABS; average particle size: 75 μm Tensile strength (MPa) | |
|---|---|---|
| | Lateral cut | Orthogonal cut |
| 10 wt % filler | 39 | 35 |
| 20 wt % filler | 37 | 32 |
| 30 wt % filler | 32 | 28 |

Since the pyrolyzed lignocellulosic biomass is more readily ground into smaller sizes and displays less cohesion (cf. supra), the pyrolysis improves the ability to manufacture more uniform and isotropic products. It this respect, it is further worth noting that the uniformity being improved in the direction perpendicular to the main printing direction (i.e. the orthogonal direction) by using the pyrolyzed lignocellulosic filler could also be observed qualitatively; for example: the distinction (e.g. when visually inspecting an orthogonally cut dumbbell) between adjacent bands/layers of printed material was less pronounced and these 'flowed more into one another'. Such blending of different layers also advantageously yields a good adhesion between them.

Finally, as already noted above, the pyrolyzed lignocellulosic fillers show a reduced moisture content and/or uptake compared to untreated lignocellulosic fillers, thereby positively contributing to avoiding moisture-related problems when printing the NFPCs based thereon.

The combination the above-described effects results in a markedly improved material: the lower viscosity allows for a higher printing output at same process screw speed and temperature, while the effect of the fillers on the rheological features of the material, simultaneously enables higher overhang angles (e.g. up to 60° or higher) and hence also overbridging—in turn creating a higher level of freedom when designing products to be printed—and the resulting printed product is more uniform and isotropic with less moisture-related issues.

It is to be understood that although preferred embodiments, specific constructions and configurations, as well as materials, have been discussed herein for devices according to the present invention, various changes or modifications in form and detail may be made without departing from the scope and technical teachings of this invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for forming an additive manufacturing material, the method comprising:

(a) providing a pyrolyzed lignocellulosic filler pyrolyzed at a temperature of from 220 to 500° C.; and (b) compounding the pyrolyzed lignocellulosic filler with a polymer matrix and optional additives;

wherein the pyrolyzed lignocellulosic filler has an average particle size between 20 and 500 μm.

2. The method according to claim 1, wherein step b comprises compounding from 0.1 to 65 wt % of the pyrolyzed lignocellulosic filler with the polymer matrix and optional additives.

3. The method according to claim 1, wherein step a comprises:

(a1) pyrolyzing a lignocellulosic biomass.

4. The method according to claim 3, wherein pyrolyzing the lignocellulosic biomass is performed at a temperature of from 220 to 400° C.

5. The method according to claim 3, wherein the lignocellulosic biomass is selected from wood, flax and bamboo.

6. The method according to claim 3, wherein step a further comprises:

(a2) grinding the pyrolyzed lignocellulosic biomass to obtain the pyrolyzed lignocellulosic filler.

7. A method for forming a product by additive manufacturing of an additive manufacturing material, comprising (i) a polymer matrix and (ii) a pyrolyzed lignocellulosic filler dispersed in the polymer matrix, the pyrolyzed lignocellulosic filler being pyrolyzed at a temperature of from 220 to 500° C. and having an average particle size between 20 and 500 μm, the method comprising:

(a) feeding the additive manufacturing material into an additive manufacturing system, and (b) printing the product using the additive manufacturing system.

8. The method according to claim 1, wherein the pyrolyzed lignocellulosic filler is a torrefied or charred lignocellulosic filler.

9. The method according to claim 1, wherein the polymer matrix is selected from a thermoplastic polymer or thermosetting polymer.

10. The method according to claim 7, wherein the additive manufacturing system is a granular material-based additive manufacturing system.

11. The method according to claim 7, wherein the product is printed having at least one dimension of 1 m or larger.

* * * * *